(12) United States Patent
Avramidis et al.

(10) Patent No.: US 8,901,220 B2
(45) Date of Patent: Dec. 2, 2014

(54) STYRENE-BUTADIENE-BASED BINDERS AND METHODS OF PREPARING AND USING SAME

(75) Inventors: Kostas S. Avramidis, Charlotte, NC (US); Mark Gordon, Huntersville, NC (US)

(73) Assignee: BASF SE, Ludwigshafen (DE)

( * ) Notice: Subject to any disclaimer, the term of this patent is extended or adjusted under 35 U.S.C. 154(b) by 409 days.

(21) Appl. No.: 13/040,907

(22) Filed: Mar. 4, 2011

(65) Prior Publication Data

US 2011/0214796 A1 Sep. 8, 2011

Related U.S. Application Data

(60) Provisional application No. 61/310,811, filed on Mar. 5, 2010.

(51) Int. Cl.
*C09J 109/06* (2006.01)
*E04F 13/14* (2006.01)
*C08K 13/02* (2006.01)
*C08K 5/5435* (2006.01)

(52) U.S. Cl.
CPC ............ *C08K 5/5435* (2013.01); *C09J 109/06* (2013.01); *E04F 13/14* (2013.01); *C08K 13/02* (2013.01)
USPC ................ 524/265; 524/261; 156/70; 156/61

(58) Field of Classification Search
CPC ......... C09J 109/06; E04F 13/14; C08K 13/02
USPC ......................................... 524/505, 265, 261
See application file for complete search history.

(56) References Cited

U.S. PATENT DOCUMENTS

| | | | |
|---|---|---|---|
| 3,738,991 A | 6/1973 | Reed | |
| 4,032,487 A | 6/1977 | Columbus | |
| 4,077,932 A | 3/1978 | Columbus | |
| 4,258,098 A * | 3/1981 | Bondoc et al. | 162/156 |
| 5,100,948 A | 3/1992 | Aydin et al. | |
| 5,100,955 A | 3/1992 | Pons et al. | |
| 5,266,322 A | 11/1993 | Myers et al. | |
| 6,001,907 A | 12/1999 | Huang | |
| 6,077,593 A | 6/2000 | Schlachter | |
| 7,033,963 B2 | 4/2006 | Felegi, Jr. et al. | |
| 7,252,888 B2 | 8/2007 | Osen et al. | |
| 2003/0144400 A1 | 7/2003 | Osen et al. | |
| 2005/0131176 A1 | 6/2005 | Zhao | |
| 2006/0178470 A1 | 8/2006 | Majolo et al. | |
| 2007/0039703 A1* | 2/2007 | Lee et al. | 162/156 |
| 2007/0059507 A1* | 3/2007 | Xing et al. | 428/292.1 |
| 2007/0059508 A1* | 3/2007 | Xing et al. | 428/292.1 |
| 2007/0299180 A1 | 12/2007 | Joecken | |
| 2009/0124151 A1* | 5/2009 | Shoemake | 442/180 |
| 2009/0159228 A1* | 6/2009 | Law et al. | 162/157.4 |
| 2010/0040832 A1* | 2/2010 | Herbert | 428/143 |

FOREIGN PATENT DOCUMENTS

| | | |
|---|---|---|
| CA | 2031405 | 6/1991 |
| EP | 0035332 | 9/1984 |
| EP | 0626397 | 11/1994 |
| EP | 0792925 | 9/1997 |
| JP | 07033484 | * 2/1995 |

OTHER PUBLICATIONS

Chemical Bonding, M.G. Kamath, Atul Dahiya, Raghavendra R. Hegde (Monika Kannadaguli & Ramaiah Kotra), p. 10.*
Augustin et al., "Volatile Organic Compounds from Adhesives and their Contribution to Indoor Air Problem" AppNote Aug. 2000, Gerstel, pp. 1-8 (2000).
Office Action issued by the Canadian Intellectual Property Office in related Application No. CA 2,734,137, dated Aug. 28, 2012; 2 pages.

* cited by examiner

*Primary Examiner* — James J Seidleck
*Assistant Examiner* — Deve E Valdez
(74) *Attorney, Agent, or Firm* — Meunier Carlin & Cuftman, LLC

(57) ABSTRACT

Styrene-butadiene-based aqueous dispersions and methods for their preparation are described herein. The aqueous dispersions include water and a binder comprising a styrene-butadiene-based copolymer and an epoxysilane. Further described herein are binder formulations and methods for their preparation and use.

27 Claims, No Drawings

STYRENE-BUTADIENE-BASED BINDERS AND METHODS OF PREPARING AND USING SAME

CROSS-REFERENCE TO RELATED APPLICATIONS

This application claims priority to U.S. Provisional Application No. 61/310,811, filed Mar. 5, 2010, which is incorporated herein by reference in its entirety.

BACKGROUND

Adhesive compositions are formulated to adhere various substrates, including, for example, ceramics, metal, plastics, paper, leather, wood, textiles, and glass. Adhesive compositions suitable for industrial applications have a high performance in substrate adhesion and are often regulated by performance standards set by international organizations including the American Society for Testing and Materials (ASTM) and the American National Standards Institute (ANSI). Typical components of approved adhesive compositions include bonding agents, solvent carriers, and additives. Certain additives, such as fillers, are used to reduce the amount of bonding agents needed for adhesion which in turn reduces the production costs of these adhesive compositions. However, high ratios of fillers to binders can result in reduced bonding capabilities and failure to meet required performance standards.

Further, high performance adhesives typically include coalescing agents or plasticizers. These additives provide the desired coalescence and surface wetting properties at temperatures at and below ambient temperatures and produce adhesives that exhibit high performance at or above room temperature. However, these coalescing agents and plasticizers are volatile organic compounds, which are detrimental to the environment.

SUMMARY

Styrene-butadiene-based binder formulations such as for adhesives and methods for their preparation are described. The styrene-butadiene-based adhesives can be prepared from aqueous dispersions. The aqueous dispersions include water, a styrene-butadiene-based copolymer, and an epoxysilane. In some examples, the styrene-butadiene-based copolymer is derived from styrene, butadiene, and one or more additional monomers. The one or more additional monomers can include acrylonitrile, acrylamide, or a reactive silane monomer (e.g., a vinyl silane).

The glass transition temperature ($T_g$) of the styrene-butadiene-based copolymer can be 23° C. or lower. For example, the $T_g$ of the styrene-butadiene-based copolymer can be from 8° C. to 16° C. In some embodiments, the complex modulus of the styrene-butadiene-based copolymer is from 0.07 MPa to 0.5 MPa at a temperature of 100° C. In some examples, the styrene-butadiene-based copolymer is a mixture of styrene-butadiene-based copolymers.

The epoxysilane can be a glycidoxysilane such as, for example, 3-glycidoxypropyl trimethoxysilane. In some examples, the epoxysilane is present in an amount of 0.5% to 3.5% by weight of the styrene-butadiene-based copolymer. In some embodiments, the epoxysilane is present in an amount of 0.25% to 2.5% by weight of the styrene-butadiene-based copolymer.

Also described herein are binder formulations comprising a styrene-butadiene-based copolymer and an epoxysilane. The binder formulations can further include a filler. In some examples, the weight ratio of the filler to the binder is at least 5:1 (e.g., from 6:1 to 12:1). The filler can be, for example, calcium carbonate. In some examples, the binder formulation is substantially free of volatile organic compounds.

Also described herein are products comprising the binder formulations. For example, the binder formulations can be used for several applications, including adhesives, coatings, carpet backing, paints, foams, textiles, sound absorbing compounds, tape joint compounds, asphalt-aggregate mixtures, waterproofing membranes, and asphalt roofing compounds. Methods of preparing the binder formulations are also provided herein. The methods include mixing the epoxysilane and aqueous styrene-butadiene-based copolymer to form the binder formulation.

Further described herein are adhesives including the binder formulations described herein. In some examples, the adhesives are tile mastics. In some examples, the wet shear strength of the tile mastic is at least 50 psi when used to bond a ceramic tile to a surface according to ANSI A 136.1 (2009). Methods of using these binder formulations, including methods of adhering a substrate to a surface, are also included. These methods include applying to the surface or to a substrate a binder formulation comprising water, a styrene-butadiene-based copolymer, and an epoxysilane, contacting the surface and the substrate along the binder formulation, and removing water from the binder formulation. In some examples, the binder formulation is applied to the surface and the substrate is applied to the surface along the binder formulation. In some examples, the substrate is a ceramic tile.

The details of one or more embodiments are set forth in the description below. Other features, objects, and advantages will be apparent from the description and from the claims.

DETAILED DESCRIPTION

Styrene-butadiene-based adhesives and methods of their preparation and use are described herein. The styrene-butadiene-based adhesives can be prepared from aqueous dispersions. The aqueous dispersions include water, a styrene-butadiene-based copolymer, and an epoxysilane. The styrene-butadiene-based copolymers described herein can be derived from styrene and 1,3-butadiene (i.e., butadiene), and optionally one or more additional monomers. The styrene-butadiene-based copolymers can include from greater than 0% to less than 100% styrene and greater than 0% to less than 100% butadiene (e.g., 10-70% styrene and 30-90% butadiene, 15-65% styrene and 35-85% butadiene, or 40-60% styrene and 40-60% butadiene (by weight)).

The styrene-butadiene-based copolymer can include up to 35% additional monomers such as acrylonitrile, acrylamide, and reactive silane monomers (e.g., vinyl silanes). An example of a suitable vinyl silane is Dynasylan® VTEO, a vinyl triethoxysilane commercially available from Evonik Degussa GmbH (Essen, Germany). Further examples of additional monomers include vinyltoluenes; conjugated dienes (e.g., isoprene); α,β-monoethylenically unsaturated mono- and dicarboxylic acids or anhydrides thereof (e.g., acrylic acid, methacrylic acid, crotonic acid, dimethacrylic acid, ethylacrylic acid, allylacetic acid, vinylacetic acid maleic acid, fumaric acid, itaconic acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C12, C1-C8, or C1-C4 alkanols such as ethyl, n-butyl, isobutyl and 2-ethylhexyl acrylates and methacrylates, dimethyl maleate and n-butyl maleate); acrylamides and alkyl-substituted acrylamides (e.g., (meth)acrylamide, N-tert-butylacrylamide, and N-methyl(meth)acrylamide); (meth)acrylonitrile; vinyl and vinylidene halides (e.g., vinyl chloride and vinylidene chloride); vinyl esters of C1-C18 mono- or dicarboxylic acids (e.g., vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); and monomers containing glycidyl groups (e.g., glycidyl methacrylate).

Additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl (meth)acrylates or alkylaminoalkyl(meth)acrylamides or quaternization products thereof (e.g., 2-(N,N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl (meth)acrylamide chloride); allyl esters of C1-C30 monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

The monomers used according to the invention may include cross-linking monomers, such as divinylbenzene; 1,4-butanediol diacrylate; methacrylic acid anhydride; monomers containing 1,3-diketo groups (e.g., acetoacetoxyethyl(meth)acrylate or diacetonacrylamide); and monomers containing urea groups (e.g., ureidoethyl (meth)acrylate, acrylamidoglycolic acid, and methacrylamidoglycolate methyl ether); and silane crosslinkers (e.g., 3-methacryloxypropyl trimethoxysilane and 3-mercaptopropyl trimethoxysilane). Additional examples of crosslinkers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers include diesters or triesters of dihydric and trihydric alcohols with α,β-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. In some examples, the styrene-butadiene-based copolymers can include from 0 to 5% by weight of one or more crosslinking monomers.

The styrene-butadiene-based copolymers can be prepared by polymerizing the monomers using free-radical emulsion polymerization. The emulsion polymerization temperature is generally from 30° C. to 95° C. or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

One or more surfactants can be included in the aqueous dispersion to improve certain properties of the dispersion, including particle stability. For example, sodium laureth sulfate and alkylbenzene sulfonic acid or sulfonate surfactants could be used. Examples of commercially available surfactants include Calfoam® ES-303, a sodium laureth sulfate, and Calfax® DB-45, a sodium dodecyl diphenyl oxide disulfonate, both available from Pilot Chemical Company (Cincinnati, Ohio). In general, the amount of surfactants employed can be from 0.01 to 5%, based on the total amount of the monomers to be polymerized.

Small amounts (e.g., from 0.01 to 2% by weight based on the total monomer weight) of molecular weight regulators, such as a mercaptan, can optionally be used. Such substances are preferably added to the polymerization zone in a mixture with the monomers to be polymerized and are considered part of the total amount of unsaturated monomers used in the copolymer.

In some examples, the styrene-butadiene-based copolymer has a glass transition temperature ($T_g$) less than or equal to room temperature (e.g., 23° C.) as measured by differential scanning calorimetry. For example, the $T_g$ of the styrene-butadiene-based copolymer can be between −20° C. and 22° C., −10° C. and 20° C., 0° C. and 18° C., 5° C. and 16° C., and 10° C. and 14° C. In some embodiments, the $T_g$ of the styrene-butadiene-based copolymer is between 8° C. and 16° C.

In some embodiments, the complex modulus of the styrene-butadiene-based copolymer is from 0.07 MPa to 0.5 MPa at a temperature of 100° C. The complex modulus (G*) of the polymers can be measured by differential mechanical analysis.

Further, the styrene-butadiene-based copolymers can include a mixture of styrene-butadiene-based copolymers. In some examples, the styrene-butadiene-based copolymers can include two or more copolymers. For example, the styrene-butadiene-based copolymers can include a mixture of styrene-butadiene copolymers and styrene-butadiene-acrylonitrile copolymers.

As described above, the aqueous dispersions include a styrene-butadiene-based copolymer and an epoxysilane. In some examples, the epoxysilane is a glycidoxysilane (e.g., 3-glycidoxypropyl trimethoxysilane). Suitable epoxysilanes include Dow Corning Z-6040® silane, a 3-glycidoxypropyl trimethoxysilane commercially available from Dow Corning Corporation (Midland, Mich.) and CoatOSil™2287 silane, a 3-glycidoxyproyl methyl diethoxysilane commercially available from Momentive Performance Materials, Inc. (Wilton, Conn.). The epoxysilane can be present in an amount of 0.05% to 3.5% by weight of the styrene-butadiene-based copolymer. In some embodiments, the epoxysilane is present in an amount from 0.25% to 2.5% by weight of the styrene-butadient-based copolymer. In some embodiments, the epoxysilane is present in an amount from 0.5% to 2.0% by weight of the styrene-butadiene-based copolymer. For example, the epoxysilane can be present in an amount of 0.1% to 3.4%, 0.5% to 3.2%, 1.0% to 3.0%, 1.5% to 2.5%, or 1.8% to 2.3%. The epoxysilane can be added to the dispersion after the polymerization of the styrene-butadiene-based copolymer or can be present during the polymerization. In some embodiments, the epoxysilane is added to the aqueous dispersion of the styrene-butadiene-based copolymer before adding the additional components that form the binder formulation. In some embodiments, the epoxysilane is added during or after the formation of the binder formulation such as for an adhesive.

The aqueous dispersions can be used to prepare binder formulations. The binder formulations can further include fillers. Examples of fillers suitable for use in the aqueous dispersions described herein include calcium carbonate, ground/recycled glass (e.g., window or bottle glass), milled glass, glass spheres, glass flakes, clays (e.g., kaolin), feldspar, mica, talc, activated carbon, metals and alloys (e.g., nickel, copper, aluminum, silicon, solder, silver, and gold), metal-plated particulates (e.g., silver-plated copper, silver-placed nickel, and silver-plated glass microspheres), sol-gel ceramics (e.g., sol-gel $SiO_2$, $TiO_2$ or $Al_2O_3$), precipitated ceramics (such as $SiO_2$, $TiO_2$ or $Al_2O_3$), fused silica, fumed silica, amorphous fused silica, aluminum trihydrate (ATH), sand, ground sand, slate dust, crusher fines, red mud, amorphous carbon (e.g., carbon black), wollastonite, alumina, bentonite, quartz, garnet, saponite, beidellite, granite, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, inorganic fibers, and mixtures thereof. The fillers described herein can be present in a weight ratio of 0 or greater parts filler to 1 part binder (i.e., the filler can be absent or present). In some embodiments, the weight ratio of the filler to binder is at least 5:1 filler to binder. In some examples, the weight ratio of the filler to the binder is from 6:1 to 12:1. For example, the weight ratio of the filler to the binder can be 7:1, 8:1, 9:1, 10:1, or 11:1.

In some embodiments, the binder formulation is substantially free of volatile organic compounds. "Substantially free" means that to the extent the dispersions contain volatile organic compounds, the amount does not result in classification as a material that contributes to the formation of ground-level ozone or smog by the United States Environmental Protection Agency. For example, the dispersion can include less than 0.1%, less than 0.01%, less than 0.001%, less than 0.0001%, or 0% volatile organic compounds based on the aqueous dispersion.

The binder formulations described herein can be used in adhesives, coatings, textiles (e.g., carpet backing), paints, foams, textiles, sound absorbing compounds, tape joint compounds, asphalt-aggregate mixtures, waterproofing membranes, and asphalt roofing compounds. In addition, the binder formulations described herein can be used to produce adhesive compositions. In some examples, the styrene-butadiene-based adhesives can be used as ceramic tile adhesives (e.g., mastics) that meet the wet shear strength requirement set forth in the American National Standard Specifications for the Installation of Ceramic Tile (ANSI A136.1 Type I and Type II) as published in 2009. The tile mastics can have a wet shear strength of at least 50 psi as measured according to the method described in ANSI A136.1. For example, the wet shear strength of the adhesive composition can be at least 52 psi, at least 54 psi, at least 56 psi, at least 58 psi, at least 60 psi, at least 62 psi, or at least 64 psi. In addition, these adhesives can be formulated with a high filler to binder ratio (e.g., at least 5:1) and no volatile organic compounds, thus providing a low cost, environmentally friendly adhesive. Further, the styrene-butadiene-based adhesives possess all physical properties associated with the use of styrene-butadiene latexes, including water-resistance and stability.

The binder formulations described herein can also be used to attach a substrate to a surface. In some examples, the surfaces and/or substrates can be ceramic, metal, plastic, paper, leather, wood, textile, or glass. For example, the substrate can be a ceramic tile. The binder formulation can be applied to a surface and a substrate to be bonded to the surface can be applied along the adhesive composition. Alternatively, the binder formulation can be applied to a substrate and a surface to be bonded to the substrate can be contacted along the adhesive composition. Water can be then removed from the composition to facilitate bonding.

The following non-limiting examples are provided to more fully illustrate some particular embodiments. Parts and percentages are provided on a per weight basis except as otherwise indicated.

EXAMPLES

Aqueous Dispersion Preparation

Styrene (46 to 67 parts by weight) and 32 to 50 parts by weight of butadiene are added to a reactor containing water. Additional monomers are optionally added to the reactor, including acrylonitrile (0 to 15 parts by weight), vinyl triethoxysilane (0 to 15 parts by weight), acrylic acid (0 to 3.9 parts by weight), itaconic acid (0 to 2.2 parts by weight), and acrylamide (0 to 2 parts by weight), followed by sodium persulfate (0.1 to 2.0 parts by weight) and tert-dodecyl mercaptan (0.1 to 2.0 parts by weight). Anionic surfactants (0.1 to 4 parts by weight), such as Calfoam® ES-303 (Pilot Chemical Company; Cincinnati, Ohio), a commercially available sodium laureth sulfate, are also added to the reactor to provide stability to the particles during polymerization. The monomers and other components of the polymerization reaction are added to the reaction zone of the reactor over a time interval ranging from 2 to 6 hours. The reactor is heated to a temperature from 75° C. to 95° C. during the polymerization. An epoxysilane, for example, 3-glycidoxypropyl trimethoxysilane, is added either during the polymerization or before the aqueous dispersion is recovered from the reactor. The aqueous dispersions prepared according to the method described above contained polymers with $T_g$ ranges from −20° C. to 15° C.

Mastic Formulation

Exemplary ingredients for a mastic formulation are shown in Table 1.

TABLE 1

| | Ingredients | Parts by weight |
|---|---|---|
| 1 | Polymer Dispersion (50% solids) | 15.6 |
| 2 | Defoamer | 0.2 |
| 3 | Water | 10.2 |
| 4 | Non-ionic Surfactant | 0.3 |
| 5 | Pigment disperser | 0.3 |
| 6 | Ethylene Glycol | 2.6 |
| 7 | Attapulgite Clay | 1.2 |
| 8 | Water | 5.7 |
| 9 | Cellulose ether thickener | 0.6 |
| 10 | Acrylic Acid Thickener | 0.6 |
| 11 | Ammonium hydroxide (26%) | 0.3 |
| 12 | Ground Calcium carbonate | 62.4 |
| 13 | Water (if needed) | 0.0 |
| | Total | 100.0 |

Components 1-7 were combined and agitated to form a homogeneous mixture. Components 8 and 9 were premixed and the combined components were added to the mixture. Component 10 was added, the mixture was stirred for 15 minutes, and component 11 was then added to adjust the pH of the mixture to 7.5-8.0. Component 12 was added and the contents were mixed until smooth and consistent. Component 13 was added in some examples to reduce the viscosity, if needed. The final mastic produced had a pH of 7.5-8.0, solids content of 70-75%, and a viscosity of 400,000 cps-600,000 cps. The viscosity of the mastic was measured by a Brookfield viscometer with helipath stand (spindle TE) at a speed of 5 rpm. In some formulations, the epoxysilane was added with the aqueous dispersion containing the polymer. In some formulations, the epoxysilane was added to the formulation separately and not with the aqueous dispersion containing the polymer.

Comparative Example 1 and Examples 1-2

The following styrene-butadiene-based polymers were used in the following examples: Polymer A ($T_g$=13° C.), Polymer B ($T_g$=7° C.), Polymer C ($T_g$=−4° C.), and Polymer D ($T_g$=15° C.). The styrene-butadiene-based polymers were provided as aqueous dispersions (Comparative Example 1). Example 1 was prepared by post-adding Dow Corning Z-6040® silane (Dow Corning Corporation; Midland, Mich.), a commercially available 3-glycidoxypropyl trimethoxysilane, to the aqueous dispersions for each polymer. Example 2 was prepared by post-adding CoatOSil™2287 silane (Momentive Performance Materials, Inc.; Wilton, Conn.), a commercially available 3-glycidoxyproyl methyl diethoxysilane, to the aqueous dispersions for each polymer. In Examples 1 and 2, the epoxysilanes were added in an amount of 1.5 wt % based on the weight of the dry polymer. Comparative Example 1, Example 1, and Example 2 were prepared as adhesives with 8:1 filler to binder ratios using $CaCO_3$ as the filler. The ANSI 136.1 Type I wet shear strengths of the adhesives were measured (Table 2).

TABLE 2

| Polymer in Aqueous | ANSI 136.1 Type I Wet Shear Strength (psi) | | |
|---|---|---|---|
| Dispersion | Comp. Ex. 1 | Example 1 | Example 2 |
| Polymer A | 12 | 58.1 | 40.3 |
| Polymer B | 10.7 | 50.7 | 38.2 |
| Polymer C | 4 | 42.8 | 27.1 |
| Polymer D | 7.9 | 63.1 | 45.5 |

As shown in Table 2, the wet shear strengths of the adhesives containing the post-added epoxysilanes (Example 1 and Example 2) improved as compared to the wet shear strengths of the adhesives not containing epoxysilanes (Comparative Example 1). Also, the adhesives containing 3-glycidoxypropyl trimethoxysilane (Example 1) displayed enhanced wet shear strengths over the adhesives containing 3-glycidoxyproyl methyl diethoxysilane). Several of the adhesive formulations met the wet strength requirement as regulated by ANSI A136.1 (i.e., at least 50 psi).

Comparative Example 2 and Examples 3-4

Polymer E is a styrene-butadiene-based polymer with a $T_g$ of 5° C. Copolymer 1 ($T_g$=5° C.) is a polymer prepared by co-polymerizing Polymer E with acrylic acid and 0.6 parts Dynasylan® VTEO (Evonik Degussa GmbH; Essen, Germany), a commercially available vinyl silane. Copolymer 2 ($T_g$=5° C.) is a polymer prepared by co-polymerizing Polymer E with 1.2 parts Dynasylan® VTEO.

The styrene-butadiene-based polymers were prepared as aqueous dispersions (Comparative Example 2). Example 3 was prepared by post-adding Dow Corning Z-6040® silane to the aqueous dispersions for each polymer and Example 4 was prepared by post-adding CoatOSil™2287 silane to the aqueous dispersions for each polymer as described in Examples 1 and 2. Comparative Example 2, Example 3, and Example 4 were prepared as adhesives with 8:1 filler to binder ratios using $CaCO_3$ as the filler. The ANSI 136.1 Type I wet shear strengths of the adhesives were measured (Table 3).

TABLE 3

| Polymer in Aqueous | ANSI 136.1 Type I Wet Shear Strength (psi) | | |
|---|---|---|---|
| Dispersion | Comp. Ex. 2 | Example 3 | Example 4 |
| Polymer E | 12.4 | 33.9 | 40.4 |
| Copolymer 1 | 18.6 | 56.9 | 35.3 |
| Copolymer 2 | 16.8 | 55.1 | 31.6 |

Similar to the above example, the wet shear strengths of the adhesives containing the post-added epoxysilanes (Example 3 and Example 4) were improved as compared to the wet shear strengths of the adhesives not containing epoxysilanes (Comparative Example 2). Further, the aqueous dispersions for the polymers containing co-polymerized vinyl silanes (Copolymer 1 and Copolymer 2) displayed enhanced wet shear strengths over the aqueous dispersion for the polymer that does not contain the co-polymerized vinyl silane (Polymer E). The adhesive formulations containing the aqueous dispersion for the co-polymerized vinyl silane polymer and the post-added Dow Corning Z-6040® silane met the wet strength requirement as regulated by the ANSI (i.e., 50 psi).

Comparative Example 3 and Examples 5-6

Polymer F ($T_g$=12° C.), Polymer G ($T_g$=8° C.), and Polymer H ($T_g$=14° C.) are styrene-butadiene-acrylonitrile containing polymers. Polymer F contains 8 parts of acrylonitrile, Polymer G contains 15 parts of acrylonitrile (15% based on the total monomer weight), and Polymer H contains 1.9 parts of acrylonitrile (1.9% based on the total monomer weight).

The styrene-butadiene-based polymers were provided as aqueous dispersions (Comparative Example 3). Example 5 was prepared by post-adding Dow Corning Z-6040® silane to the aqueous dispersions for each polymer. Example 6 was prepared by post-adding CoatOSil™2287 silane to the aqueous dispersions for each polymer. In Examples 5 and 6, the epoxysilanes were added in an amount of 1.5 wt % based on the weight of the dry polymer. Comparative Example 3, Example 5, and Example 6 were prepared as adhesives with 8:1 filler to binder ratios using $CaCO_3$ as the filler. The ANSI 136.1 Type I wet shear strengths of the adhesives were measured (Table 4).

TABLE 4

| Polymer in Aqueous | ANSI 136.1 Type I Wet Shear Strength (psi) | | |
|---|---|---|---|
| Dispersion | Comp. Ex. 3 | Example 5 | Example 6 |
| Polymer F | 8.2 | 42.4 | 39.5 |
| Polymer G | 10.3 | 55.6 | 38.8 |
| Polymer H | 8.2 | 42.6 | 37.4 |

As shown in Table 4, the wet shear strengths of the adhesives containing the ost-added epoxysilanes (Example 5 and Example 6) were improved as compared to the wet shear strengths of the adhesives not containing epoxysilanes (Comparative Example 3). The adhesives containing 3-glycidoxypropyl trimethoxysilane (Example 5) displayed enhanced wet shear strength over the adhesives containing 3-glycidoxyproyl methyl diethoxysilane (Example 6). Further, as the polarity of the polymers increased (i.e., increased parts of acrylonitrile in the polymers), the wet strength of the 3-glycidoxypropyl trimethoxysilane containing adhesives also increased. The adhesive formulation containing 15 parts acrylonitrile and 3-glycidoxypropyl trimethoxysilane met the wet strength requirement as regulated by the ANSI (i.e., 50 psi).

Examples 7-9

A mastic was prepared using an aqueous dispersion containing Polymer A by adding Dow Corning Z-6040® silane (3.2 parts per 100 parts of dry polymer) during mastic formulation, i.e., the epoxysilane was not present in the aqueous dispersion of Polymer A (Example 7). Example 8 was prepared by post-adding Dow Corning Z-6040® silane (1.6 parts per 100 parts of dry polymer) to an aqueous dispersion containing Polymer A, heat aging the aqueous dispersion at 50° C. for 3 months, and forming a mastic with the heat aged aqueous dispersion. Example 9 was prepared as described for Example 8 except 0.85 parts of Dow Corning Z-6040® silane per 100 parts of dry polymer was post-added to the aqueous dispersion. The ANSI 136.1 Type I wet shear strengths of the 8:1 filler to binder ratio mastics using $CaCO_3$ as the filler are listed in Table 5. As shown in Table 5, although the mastic containing epoxysilane added during mastic formulation produced desirable wet shear strength, the wet shear strengths of the mastics were equal or higher when lower levels (e.g., 1.6% and 0.85%) of epoxysilane were post-added to the aqueous dispersion and heat aged.

TABLE 5

| Mastic | | ANSI 136.1 Type I Wet | |
|---|---|---|---|
| Identi- | | Shear Strength (psi) | |
| fication | Description | Average | Standard Deviation |
| Example 7 | Epoxysilane (3.2%) added during mastic preparation; latex not heat aged | 66.5 | 11.7 |
| Example 8 | Epoxysilane (1.6%) post-added to latex and heat aged | 87.3 | 11.2 |
| Example 9 | Epoxysilane (0.85%) post-added to latex and heat aged | 66.8 | 12.4 |

Examples 10-13

A mastic was prepared using an aqueous dispersion containing Polymer D by adding Dow Corning Z-6040® silane (3.1 parts per 100 parts of latex solids) during mastic formulation (Example 10). Example 11 was prepared as described for Example 10 except that the aqueous dispersion had been heat aged at 50° C. for 3 months. Example 12 was prepared by post-adding Dow Corning Z-6040® silane (0.8 parts per 100 parts of dry polymer) to an aqueous dispersion containing Polymer D and forming a mastic containing the aqueous dispersion and the epoxysilane. The aqueous dispersion was not heat aged for Example 12. Example 13 was prepared as described for Example 12 except 1.5 parts of Dow Corning Z-6040® silane per 100 parts of dry polymer was post-added to the aqueous dispersion and the aqueous dispersion was heat aged at 50° C. for 3 months. The ANSI 136.1 Type I wet shear strengths of the 8:1 filler to binder ratio mastics using $CaCO_3$ as the filler are listed in Table 6. As shown in Table 6, the wet shear strength of the mastic to which an epoxysilane was added during mastic preparation decreased when the latex used had been heat aged at 50° C. for 3 months. Further, in comparing the mastics prepared using the heat-aged latexes, the wet shear strength of the mastic in Example 13 made using the aqueous dispersion containing an epoxysilane (post-added) and heat aged was higher than the mastic for which the epoxysilane was added during mastic formulation (Example 11) even though Example 11 included about twice as much epoxysilane as Example 13. The lower mastic strength in Example 11 could possibly also be due to the larger amount of epoxysilane added and the increase of crosslinking that may have occurred in the latex.

TABLE 6

| Mastic | | ANSI 136.1 Type I Wet Shear Strength (psi) | |
|---|---|---|---|
| Identification | Description | Average | Standard Deviation |
| Example 10 | Epoxysilane (3.1%) added during mastic preparation; latex not heat aged | 79.5 | 16.6 |
| Example 11 | Epoxysilane (3.1%) added during mastic preparation; latex heat-aged | 25.9 | 8.3 |
| Example 12 | Epoxysilane (0.8%) post-added to latex and not heat aged | 59.7 | 10.0 |
| Example 13 | Epoxysilane (1.5%) post-added to latex; latex heat-aged | 50.1 | 9.7 |

Examples 14-17

A styrene-butadiene copolymer-containing aqueous dispersion was prepared in the same manner as Example 10 using 0.29 parts of tert-dodecyl mercaptan per 100 parts of total monomer and 0.88 parts of sodium persulfate per 100 parts of total monomer as the initiator (Example 14). Example 15 was prepared in the same manner as Example 14 except 0.44 parts of tert-dodecyl mercaptan (i.e., 50% more than added in Example 14) was added during polymerization. Example 16 was prepared as described for Example 14 except 1.3 parts of sodium persulfate per 100 parts of total monomer (i.e., 50% more than added in Example 14) was used in the polymerization. Example 17 was prepared as described for Example 14 except 1.8 parts of sodium persulfate per 100 parts of total monomer (i.e., twice the amount of initiator added in Example 14) was added. Example 18 was prepared as described for Example 14 except 0.59 parts of tert-dodecyl mercaptan per 100 parts of total monomer (i.e., twice the amount of mercaptan added in Example 14) was used in the polymerization. The ANSI 136.1 Type I wet shear strengths of the 8:1 filler to binder ratio mastics using $CaCO_3$ as the filler are listed in Table 7. As shown in Table 7, mastic formulations made using aqueous dispersions containing polymers with lower molecular weights due to increased levels of mercaptan (i.e., 50% more mercaptan) display improved wet shear strength as compared to Example 14 described above.

TABLE 7

| Mastic | Description | ANSI 136.1 Type I Wet Shear Strength (psi) |
|---|---|---|
| Example 14 | Epoxysilane (3.1%) used during mastic preparation | 36.5 |
| Example 15 | Epoxysilane (3.1%) used during mastic preparation and 50% additional mercaptan used | 57.2 |
| Example 16 | Epoxysilane (3.1%) used during mastic preparation and 50% additional initiator used | 34 |
| Example 17 | Epoxysilane (3.1%) used during mastic preparation and 2 x mercaptan used | 25.2 |
| Example 18 | Epoxysilane (3.1%) used during mastic preparation and 2 x initiator used | 38 |

The composites and methods of the appended claims are not limited in scope by the specific composites and methods described herein, which are intended as illustrations of a few aspects of the claims and any composites and methods that are functionally equivalent are intended to fall within the scope of the claims. Various modifications of the composites and methods in addition to those shown and described herein are intended to fall within the scope of the appended claims. Further, while only certain representative composite materials and method steps disclosed herein are specifically described, other combinations of the composite materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. A binder formulation, comprising a styrene-butadiene-based copolymer derived from styrene, butadiene, and a reactive silane monomer; and an epoxysilane, wherein the epoxysilane is present in an amount of from 0.05% to 3.5% by weight, based on the weight of the styrene-butadiene-based copolymer.

2. The binder formulation of claim 1, wherein the styrene-butadiene-based copolymer is further derived from one or more additional monomers comprising acrylonitrile, acrylamide, or combinations thereof.

3. The binder formulation of claim 1, wherein the reactive silane monomer comprises a vinyl silane.

4. The binder formulation of claim 1, wherein the $T_g$ of the styrene-butadiene-based copolymer is 23° C. or lower.

5. The binder formulation of claim 4, wherein the $T_g$ of the styrene-butadiene-based copolymer is from 8° C. to 16° C.

6. The binder formulation of claim 1, wherein the complex modulus of the styrene-butadiene-based copolymer is from 0.07 MPa to 0.5 MPa at a temperature of 100° C.

7. The binder formulation of claim 1, wherein the epoxysilane comprises a glycidoxysilane.

8. The binder formulation of claim 7, wherein the glycidoxysilane comprises 3-glycidoxypropyl trimethoxysilane.

9. The binder formulation of claim 1, wherein the epoxysilane is present in an amount of 0.25% to 2.5% by weight of the styrene-butadiene-based copolymer.

10. The binder formulation of claim 1, wherein the styrene-butadiene-based copolymer comprises a mixture of styrene-butadiene-based copolymers.

11. The binder formulation of claim 1, further comprising a filler.

12. The binder formulation of claim 11, wherein the weight ratio of the filler to the binder is at least 5:1.

13. The binder formulation of claim 12, wherein the weight ratio of the filler to the binder is from 6:1 to 12:1.

14. The binder formulation of claim 11, wherein the filler comprises calcium carbonate.

15. The binder formulation of claim 1, wherein the binder formulation is substantially free of volatile organic compounds.

16. A product comprising the binder formulation of claim 1, wherein the product is an adhesive, a coating, a carpet backing, a paint, a foam, a textile, a sound absorbing compound, a tape joint compound, an asphalt-aggregate mixture, a waterproofing membrane, or an asphalt roofing compound.

17. An adhesive comprising the binder formulation of claim 1.

18. The adhesive of claim 17, wherein the adhesive composition is a tile mastic.

19. The adhesive of claim 18, wherein the wet shear strength of the tile mastic is at least 50 psi when used to bond a ceramic tile to a surface according to ANSI A 136.1 (2009).

20. An aqueous dispersion, comprising water and the binder formulation of claim 1.

21. A method of preparing a binder formulation, comprising mixing an epoxysilane and an aqueous styrene-butadiene-based copolymer derived from styrene, butadiene, and to form the binder formulation, wherein the epoxysilane is present in the resulting mixture in an amount of from 0.05% to 3.5% by weight, based on the weight of the styrene-butadiene-based copolymer.

22. A method of adhering a substrate to a surface, comprising the steps of:
(1) applying to a surface or to a substrate a binder formulation, comprising water, a styrene-butadiene-based copolymer derived from styrene, butadiene, and a reactive silane monomer and an epoxysilane wherein the epoxysilane is present in the binder formulation in an amount of from 0.05% to 3.5% by weight, based on the weight of the styrene-butadiene-based copolymer;
(2) contacting the surface and the substrate along the binder formulation; and
(3) removing water from the binder formulation.

23. The method of claim 22, wherein the substrate is ceramic tile.

24. The method of claim 23, wherein the wet shear strength of the tile mastic is at least 50 psi when used to bond a ceramic tile to a surface according to ANSI A 136.1 (2009).

25. The method of claim 22, wherein the adhesive composition is applied to the surface and the substrate is applied to the surface along the adhesive composition.

26. The method of claim 22, wherein the $T_g$ of the styrene-butadiene-based copolymer is 23° C. or lower.

27. A tile mastic comprising:
(a) a binder comprising a styrene-butadiene-based copolymer and an epoxysilane, wherein the epoxysilane is present in an amount of from 0.05% to 3.5% by weight, based on the weight of the styrene-butadiene-based copolymer; and
(b) a filler,
wherein the weight ratio of the filler to the binder is from 5:1 to 12:1.

* * * * *